US008809755B1

(12) United States Patent
Patel et al.

(10) Patent No.: US 8,809,755 B1
(45) Date of Patent: Aug. 19, 2014

(54) AIRCRAFT, MISSILE, PROJECTILE OR UNDERWATER VEHICLE WITH IMPROVED CONTROL SYSTEM AND METHOD OF USING

(75) Inventors: Mehul Patel, Chandler, AZ (US); T. Terry Ng, Sylvania, OH (US); Paul Suchy, Parma, OH (US)

(73) Assignee: Orbital Research Inc., Cleveland, OH (US)

( * ) Notice: Subject to any disclaimer, the term of this patent is extended or adjusted under 35 U.S.C. 154(b) by 2179 days.

(21) Appl. No.: 11/292,533

(22) Filed: Dec. 2, 2005

(51) Int. Cl.
*F42B 10/12* (2006.01)
*B64C 5/10* (2006.01)

(52) U.S. Cl.
USPC .......................................... 244/3.26; 244/46

(58) Field of Classification Search
USPC ........ 244/3.24–3.26, 46, 87, 99.11; 114/21.1, 114/23
See application file for complete search history.

(56) References Cited

U.S. PATENT DOCUMENTS

| | | | | |
|---|---|---|---|---|
| 2,752,850 | A * | 7/1956 | Warner et al. | 244/3.26 |
| 2,858,091 | A * | 10/1958 | Kapenkin | 244/218 |
| 2,992,794 | A * | 7/1961 | Boyd | 244/3.15 |
| 3,181,820 | A * | 5/1965 | Burnelli | 244/87 |
| 3,493,197 | A * | 2/1970 | Spearman | 244/218 |
| 3,730,460 | A * | 5/1973 | Mederer | 244/53 R |
| 3,757,121 | A * | 9/1973 | Poirier | 250/316.1 |
| 4,024,998 | A * | 5/1977 | Rabinow et al. | 244/3.26 |
| 4,025,007 | A * | 5/1977 | Kaniut | 244/15 |
| 4,365,774 | A * | 12/1982 | Coronel | 244/46 |
| 5,052,641 | A * | 10/1991 | Coleman | 244/218 |
| 5,271,579 | A * | 12/1993 | De Luca | 244/3.24 |
| 5,615,846 | A * | 4/1997 | Shmoldas et al. | 244/3.28 |
| 5,669,582 | A * | 9/1997 | Bryant et al. | 244/76 C |
| 5,687,077 | A * | 11/1997 | Gough, Jr. | 700/29 |
| 6,286,789 | B1 * | 9/2001 | Shimovetz | 244/201 |
| 6,672,540 | B1 * | 1/2004 | Shaheen et al. | 244/99.3 |
| 6,685,143 | B1 * | 2/2004 | Prince et al. | 244/203 |
| 6,789,763 | B2 * | 9/2004 | Ben-Ari | 244/3.15 |
| 6,986,481 | B2 * | 1/2006 | Fanucci et al. | 244/3.26 |

OTHER PUBLICATIONS

"Fln" Wikipedia, the Free Encyclopedia, Nov. 27, 2005 available at http://en.wikipedia.org/w/index.php?title=Fin&diff=29359129&oldid=23151392.*
"Autopilot" Wikipedia, the Free Encyclopedia, Sep. 28, 2005 http://en.wikipedia.org/w/index.php?title=Autopilot&oldid=24250352.*

(Continued)

*Primary Examiner* — Joseph W Sanderson
(74) *Attorney, Agent, or Firm* — Brian M. Kolkowski; Robert Knecht Schmidt

(57) ABSTRACT

The present invention relates to an aircraft, missile, projectile or underwater vehicle with an improved control system, an improved control system and a method of maneuvering an aircraft, missile, projectile or underwater vehicle. More particularly, the present invention relates to an aircraft, missile, projectile or underwater vehicle with control surfaces that are movable along a track. The present invention further relates to a method of controlling a aircraft, missile, projectile or underwater vehicle using such a control system. One of the technical advantages of the control system on a track (or "tracked control surface") over other aircraft, missile, projectile or underwater vehicle control systems is that the tracked control surface system enables the aircraft, missile, projectile or underwater vehicle to have an unlimited number of configurations, each configuration being tailored to the specific stability or maneuverability requirements during a specific portion of the flight.

20 Claims, 7 Drawing Sheets

(56) References Cited

OTHER PUBLICATIONS

"Tailplane." Collins English Dictionary. London: Collins, 2000. Credo Reference. Web. Jan. 8, 2010. available at http://www.xreferplus.com/entry/hcengdict/tailplane.*

"Fin 1." Collins English Dictionary. London: Collins, 2000. Credo Reference. Web. Jan. 8, 2010. available at http://www.xreferplus.com/entry/hcengdict/fin_1.*

McKeehen, P.D., Pershing, M., Warner, D.A., and Blake, W.B., "Dynamic Modeling and Simulation of a Small Destructive Projectile," at the 2001 AIAA Modeling and Simulation Technologies Conference, Montreal, Canada, Aug. 2001.

Pershing, M., McKeehen, P.D., Blake, W.B., and Warner, D.A., "Simulation and Analysis of Missile Countermeasures Using a Destructive Expendable (DEX)," for the 46th Annual Joint Electronic Warfare Conference, Monterey, CA, May 2001.

* cited by examiner

AIRCRAFT, MISSILE, PROJECTILE OR UNDERWATER VEHICLE WITH IMPROVED CONTROL SYSTEM AND METHOD OF USING

The U.S. Government has a paid-up license in this invention and the right in limited circumstances to require the patent owner to license others on reasonable terms provided for by the terms of contract number FA8650-04-M-1646 issued by the United States Air Force, Wright-Patterson Air Force Base.

BACKGROUND OF THE INVENTION

1. Field of the Invention

The present invention relates to an aircraft, missile, projectile or underwater vehicle with an improved control system, an improved control system and a method of maneuvering an aircraft, missile, projectile or underwater vehicle. More particularly, the present invention relates to an aircraft, missile, projectile or underwater vehicle with control surfaces that are movable along a track. The present invention further relates to a method of controlling an aircraft, missile, projectile or underwater vehicle using such a control system.

2. Technical Background

The ability to adaptively modify and control a vehicle's static and dynamic stability in-flight has vast potential in a diverse array of aeronautical and underwater applications including extreme vehicle maneuvering, collision avoidance, collision seeking, end-game maneuvering, stall prevention, and managing aerodynamic forces and moments. There is no doubt, that in the era of growing aeronautical and aerospace use, air vehicles with fast-acting control surfaces and methodologies that allow dynamic, in-flight reconfiguration of the vehicle's stability and aerodynamic performance are critical to the success and development of the next-generation, high-performance vehicles. Examples include weapons that are designed to seek-and-destroy moving and emerging high-priority targets, active flares that are deployed from aircraft to defend against enemy missiles, or fighter aircraft that need rapid maneuvering capabilities during dog-fighting. In general, it is highly desirable to have an aircraft, missile, projectile, or underwater vehicle be able to readjust its path in a quick and effective manner. In the case of missiles or projectiles, it is not only desirable but necessary to possess the ability to actively adjust the vehicle stability and maneuverability in-flight so as to sustain high loads during launch and to pursue moving targets, respectively.

The trade-off between stability and maneuverability is always a challenging assessment in the case of vehicles that require both 'stable flight' and 'supermaneuverability' during different stages of their flight envelope. An example of such a vehicle is a small rocket-powered flare or a projectile that is used as a defensive countermeasure for aircraft against enemy missiles. For a successful employment of such a countermeasure system, the flare needs to be fired from an aircraft in such a way that it can be maneuvered into the path of the incoming missile for physical interception and destruction. This style of execution requires both heightened stability and supermaneuverability, which is uncharacteristic of traditional flares or air vehicles.

Additional problems with control surface designs arise when a missile or projectile must be fired at an angle from a fast moving aircraft. A missile or projectile fired at an angle from a quickly moving aircraft must be extremely stable to overcome the high cross-winds and yawing moment during the launch phase. Inadequate stability will result in the missile or projectile tumbling out of control shortly after launch. Air-to-air and air-to-ground missiles are normally fired in the same direction of the aircraft from which it was launched. Any change in direction away from that of the aircraft from which it was fired, occurs after the missile or projectile is in flight. This eliminates any cross winds caused by the forward motion of the aircraft as the winds will be parallel with the bodies of the aircraft and missile or projectile. However, when an air-to-air or air-to-ground missile is fired at any angle not directly forward or directly backwards of the aircraft (0 and 180 degrees respectively), they are subject to crosswinds generated by the forward movement of the aircraft. The higher the launch angle is away from 0 or 180 degrees, the greater the crosswinds. The crosswinds will increase approaching 90 degrees from forward where they will be greatest, and decrease approaching 180 degrees where they will return to 0. Overcoming the cross-winds and yawing moment requires large control surfaces for stability. But a missile or projectile with large control surfaces will not be able to adequately maneuver because its large control surfaces place its center of pressure far behind its center of mass. This problem has thus far prevented large scale use of aircraft-launched missiles or projectiles that are launched at an angle.

The stability for maneuverability trade-off is worthwhile in the case of long-range missiles and other types of projectiles that require stability and with conventional fixed-wing aircraft, such as commercial aircraft, that do not conduct complex maneuvers. The maneuverability for stability trade-off is worthwhile for missiles and projectiles that require great maneuverability and are not intended to fly long distances at straight trajectories and for aircraft, such as fighter-planes that must perform complex maneuvers. However, a problem arises when both traits of maneuverability and stability must be combined over the flight of an aircraft, missile, projectile or underwater vehicle. Normally, stability and maneuverability are not required during the same time period but rather at different segments of a flight. An example of a missile requiring both stability and maneuverability at separate segments of a flight is a destructive expendable (DEX). A DEX is a small missile used as a defensive measure against a surface-to-air missile or air-to-air missile fired at an aircraft. A DEX is fired from an aircraft when an incoming missile is detected. Because the incoming missile can approach the aircraft from any angle (upper/lower/front/rear hemispheres), the DEX must be able to be launched at any angle not just forwards or backwards. The DEX then flies towards the incoming missile and intercepts it, thus destroying the threat to the aircraft. Both firing from the aircraft and flight towards the missile require heightened stability provided by large aftward control surfaces. However, when acquiring the target and approaching the incoming missile, the DEX requires maneuverability for intercepting the missile.

Creating vehicles with high stability and maneuverability has long been a goal in the art, and has been accomplished by a number of means. Canards, elevators, ailerons, elevons and other forms of control surfaces are typically used to provide control and stability. However, most vehicles have a single-point design, where the design of the aerodynamic control system is optimized for the conditions likely to be encountered for the majority of the vehicle's flight path. To design vehicles that are both stable as well as maneuverable, multi-point designs involving adaptive, in-flight modifications to the control surfaces are proposed.

Moveable control surfaces have also been developed to increase the maneuverability of missiles, aircraft or projectiles. These control surfaces control the direction of the aircraft, missile, projectile or underwater vehicle by redirecting airflow over the body and control surfaces during flight. The moveable control surfaces either rotate about their connection point to the body, or the control surfaces' trailing edges are moved upwards and downwards such as ailerons or rudders. Moveable control surfaces however, do not address the problem of the aftward center of pressure created by large control surfaces placed towards the rear of the aircraft, missile, projectile or underwater vehicle. Moveable control surfaces also provide no additional stability for a missile or projectile when launched at an angle from a moving aircraft because moveable control surfaces cannot redirect any cross-winds traveling perpendicular to the missile. Additionally, control systems of the moveable control surfaces add more weight and complexity, thus counteracting some of the maneuverability gained from the moveable control surfaces.

In view of the foregoing inherent disadvantages with presently available aircraft, missile, projectile or underwater vehicle control devices, it an object of the present invention to develop a system for controlling aircraft, missiles, projectiles or underwater vehicles that allows for these devices to be successfully maneuvered. In the case of missiles or projectiles to be launched at an angle from a moving aircraft, and maintain a stable flight to its target or to perform rapid maneuvers in order to intercept and destroy its target. Additionally, there is a need to develop a method for effectively controlling these aircraft, missiles, projectiles or underwater vehicles in order to enhance their mission.

SUMMARY OF THE INVENTION

The present invention relates to an aircraft, missile, projectile or underwater vehicle with an improved control system, an improved control system and a method of maneuvering an aircraft, missile, projectile or underwater vehicle. More particularly, the present invention relates to an aircraft, missile, projectile or underwater vehicle with control surfaces that are movable along a track. The present invention further relates to a method of controlling an aircraft, missile, projectile or underwater vehicle using such a control system.

One of the technical advantages of the control system on a track (or "tracked control surface") over other aircraft, missile, projectile or underwater vehicle control systems is that the tracked control surface system enables the aircraft, missile, projectile or underwater vehicle to have an unlimited number of configurations, each configuration being tailored to the specific stability or maneuverability requirements during a specific portion of the flight. By moving the control surfaces forward and backward, up and down or in any other directions, along their tracks, the center of pressure can be infinitely varied to produce the optimal maneuverability configuration. The configuration can be set either by a predetermined set of parameters, by a user in real-time or by sensors communicating with the onboard control system to control actuators that move the control surfaces. The present invention alters the configuration of the aircraft, missile, projectile or underwater vehicle's tracked control surfaces. However, the present invention, unlike current control systems, moves the control surfaces in any direction in which a track has been established on the body of the aircraft, missile, projectile or underwater vehicle. Movement of the control surfaces alters the center of pressure relative to the center of gravity thus altering the stability of the aircraft, missile, projectile or underwater vehicle according to its specific requirements at a given time.

The method of maneuvering an aircraft, missile, projectile or underwater vehicle uses control surface(s) to adjust the center of pressure of an aircraft, missile, projectile or underwater vehicle. The control surfaces attach to a track which is embedded or attached longitudinally to the body of the unit being controlled. The connection point where the control surface attaches to the track is moveable along the track thus allowing the control surface to move in different directions along the track. In this manner, the control surfaces are infinitely adjustable along the track. In the case of a commercial aircraft, two or more tracks are positioned along opposite sides of the fuselage and allow the control surfaces, specifically wings, to move in unison with one another at equal and opposite positions along the tracks.

Movement of the control surfaces is preferably conducted by an onboard control system. The control system monitors parameters from the sensor or device outputs and analyzes the data to determine whether any changes to the position of the control surfaces is necessary. Sensors or devices feeding data into the control system can be located on the launch vehicle, aircraft, missile, projectile or underwater vehicle body; a control surface such as a wing; or located remotely. If the sensor or device is located remotely, the sensor output must be transmitted to a receiver on the vehicle. Devices can include but are not limited to GPS, radar, altimeter, barometer, IR, RF, and transmitter beacons. Sensors can include but are not limited to position, speed, distance, airflow, and pressure sensors. The output of the sensors or devices is used to adjust the positioning of the control surfaces and thus adjust the configuration of the aircraft, missile, projectile or underwater vehicle. For instance, if a missile's IR detection determines that an aircraft had just commenced an evasive maneuver, the control system on the missile would reconfigure its control surfaces to make itself more maneuverable in order to track the aircraft. The control system can take the form of a closed loop control system such as a PID system, computer or other means.

Because the position of the control surfaces is infinitely variable along the tracks, a multitude of positions corresponding to varying degrees of stability are possible. Control surfaces can be varied from the most stable, generally aft, configuration to the most maneuverable position, generally forward. Stability will vary proportionately with the position of the control surface on the track relative to the aircraft, missile, projectile or underwater vehicle's center of gravity.

The number of control surfaces that are movable along the track varies according to the specific purposes of the aircraft, missile, projectile or underwater vehicle. Any, all or none of the control surfaces may be movable. Additionally, multiple control surfaces may be situated along one track. One, all or some of these multiple control surfaces may be movable, while one or some control surfaces may be stationary. For example if input from a cruise missile's GPS informs the controller that the missile is moving within range of a surface-to-air missile battery, but no missile has been fired, the cruise missile can move two of its four control surfaces forward in anticipation of evasive maneuvers that it will likely have to perform. Yet a further example of moving additional control surfaces is if that same cruise missile's RF sensor detects a missile launch from the surface-to-air missile battery. The cruise missile will then move the remaining two of the original four control surfaces forward to gain maximum maneuverability. Additionally the cruise missile may move all of its tracked control surfaces as forward as possible to gain maximum maneuverability to avoid the incoming missile.

In one embodiment, the present invention includes a method for maneuvering an aircraft, missile, projectile or underwater vehicle comprising the step of moving a control surface along a track positioned on the aircraft, missile, projectile or underwater vehicle's body.

In another embodiment, the present invention includes a method for maneuvering an aircraft, missile, projectile or underwater vehicle comprising the steps of a) moving a control surface along a track positioned on the aircraft, missile, projectile or underwater vehicle's body; b) sensing a condition which requires a change in the center of pressure of the aircraft, missile, projectile or underwater vehicle with at least one device having an output wherein the moving of the control surface is performed based in part on the output.

In still another embodiment, the present invention includes a method for maneuvering an aircraft, missile, projectile or underwater vehicle comprising the steps of a) moving a control surface along a track positioned on the aircraft, missile, projectile or underwater vehicle's body; b) sensing a condition which requires a change in the center of pressure of the aircraft, missile, projectile or underwater vehicle with at least one device having an output wherein the moving of the control surface is performed based in part on the output; and c) controlling the moving of the control surface with a closed loop controller based in part on the output of the at least one device.

In still another embodiment, the present invention includes an apparatus for maneuvering an aircraft, missile, projectile or underwater vehicle comprising a) a body; b) at least one track; and c) at least one control surface for moving along the at least one track, wherein the at least one control surface can be repositioned along the body by moving the control surface along the at least one track.

In still another embodiment, the present invention includes an apparatus for maneuvering an aircraft, missile, projectile or underwater vehicle comprising a) a body; b) at least one track; and c) at least one control surface for moving along the at least one track, wherein the control surface is stationary, is movably attached to the track on the body and can be moved forward or aft along the body.

In still another embodiment, the present invention includes an apparatus for maneuvering an aircraft, missile, projectile or underwater vehicle comprising a) a body; b) at least one track; and c) at least one control surface for moving along the at least one track; d) at least one stationary control surface, wherein the second stationary control surface can be reconfigured by moving the at least one control surface along a track relative to the second stationary control surface.

In still another embodiment, the present invention includes a method of controlling the shape of control surface on an aircraft, missile, projectile or underwater vehicle comprising the step of moving a control surface along a track positioned on the aircraft, missile, projectile or underwater vehicle's body with respect to a second stationary control surface.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DESCRIPTION OF THE PREFERRED EMBODIMENT(S)

Figure 1:
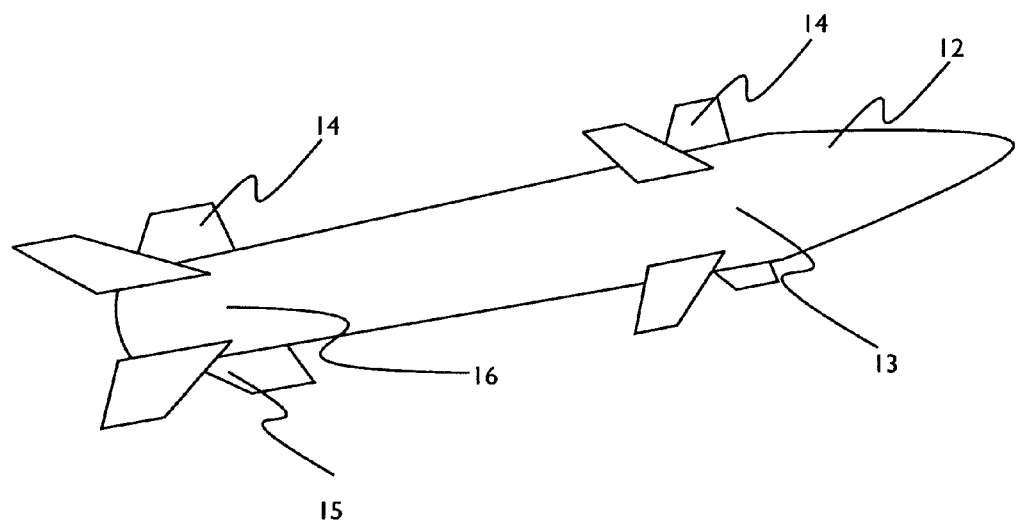
FIG. 1. Isometric view of one embodiment of a missile having a number of control surfaces.

The present invention relates to an aircraft, missile, projectile or underwater vehicle with an improved control system, an improved control system and a method of maneuvering an aircraft, missile, projectile or underwater vehicle. More particularly, the present invention relates to an aircraft, missile, projectile or underwater vehicle with control surfaces that are movable along a track. The present invention further relates to a method of controlling an aircraft, missile, projectile or underwater vehicle using such a control system.

The aircraft, missile, projectile or underwater vehicle of the present invention is preferably any one of those devices with the improved control system described in this application. Underwater vehicles include but are not limited to torpedoes and submarines. Projectiles include but are not limited to large caliber bullets, shells, bombs and bomblets. The control system, alone or as part of the aircraft, missiles, projectiles and underwater vehicles described in various other embodiments of the present invention, preferably allow the user of these vehicles or devices to change the center of pressure of the device in flight or in the case of an underwater vehicle such as a torpedo or a submarine after firing or during operations respectively.

The aircraft, missile, projectile or underwater vehicle preferably comprises a body, at least one track, and at least one control surface for moving along the at least one track. The control surface being repositionable in flight, after firing or during operation. The control system of the present invention comprises at least one track, and at least one control surface for moving along the at least one track. Preferably the control systems of the various embodiments of the present invention contain a number of tracks as well as a number of control surfaces, which will improve the versatility and maneuverability of the aircraft, missile, projectile or underwater vehicle upon which the control system is preferably used. Still preferably, the control system contains at least two tracks. More preferably, the control system contains at least three tracks. Still more preferably, the control system contains at least four tracks. Most preferably, the control system contains at least six tracks. Still preferably, the control system contains at least two control surfaces, which move along a track. More preferably, the control system contains at least three control surfaces, which move along a track. Still more preferably, the control system contains at least four control surfaces, which move along a track. Most preferably, the control system contains at least six control surfaces, which move along a track. In various embodiments of the present invention, one or more control surfaces can move along a single track.

The control surfaces of the present invention are any surface attached to the body of the aircraft, missile, projectile or underwater vehicle, which affects center of pressure of the device. Examples include but are not limited to wings, fins, stabilizers, and control planes specifically for underwater vehicles.

The control surfaces are preferably actuated by an onboard control system. The controller can be for example a proportional-integral-derivative (PID) controller, an adaptive predictive controller, or an adaptive predictive feedback controller. The controller of the present invention is preferably a closed loop control system. The control system monitors parameters from sensor or other devices outputs and analyzes the data to determine whether any changes to the stability of the aircraft, missile or projectile need to be made. Sensors or devices feeding data into the control system can be located on the aircraft, missile, projectile or underwater vehicle body; a control surface of such device such as a wing; or located remotely. If the sensor or device is located remotely, the sensor output must be transmitted to a receiver on the aircraft, missile or projectile. Devices can include, but are not limited to GPS, radar, altimeter, barometer, IR, RF, and transmitter beacons. Sensors can include but are not limited to position, speed, distance, airflow, and pressure sensors. The output of these sensors or devices is used to determine when the control surfaces must be moved or repositioned along the track. The sensor or device transmits a signal to the controller through either an electrical connection or by RF (in practical application, multiple sensors or devices send multiple signals to the controller or multiple controllers). The controller(s) processes the signal(s) to determine, through mathematical modeling, the dynamics of aircraft, missile, projectile or underwater vehicle. It is the predictive ability of the controller, which expands this system from being merely responsive. This is especially advantageous for dynamic systems, which are nonlinear and time varying and operating in challenging environments. For example, if a missile's IR detection system determines that an enemy missile has just commenced an evasive maneuver, the control system on the missile would release the removable control surfaces to make the missile more maneuverable in order to intercept the enemy missile. The controller preferably is a computer or microprocessor. The controller produces an output signal to an actuator, monitor, recorder, alarm and/or any peripheral device for alarming, monitoring, or in some manner, affecting or more rapidly adjusting the dynamics upon its incipience. Preferably, the output of the controller is used to actuate the motor or hydraulics, which moves the control surface along the track. Advantageously, the controller is the ORICA™ controller, an extended horizon, adaptive, predictive controller, produced by Orbital Research, Inc. and patented under U.S. Pat. No. 5,424,942, which is incorporated herein by reference. Under certain conditions, the controller (or optionally an external controller) which is preferably connected via electrical connection to the motor(s) or hydraulic(s) causes the motor or hydraulic system to move the control surface. The control system can also be a partially closed loop control system, which accepts input from not only the sensor(s) or device(s) but from other systems as well including in some situations human input.

The present invention also includes many methods of using these control systems as well. In one embodiment, a control surface is moved along a track positioned on an aircraft, missile, projectile or underwater vehicle's body. Another embodiment is this same step except that a condition is sensed which requires a change in the center of pressure of the aircraft, missile, projectile or underwater vehicle with at least one device or sensor having an output, and wherein the control surface is moved based in part on the output of the at least one device or sensor. Still another embodiment is where the movement of such control surface is determined with a closed loop controller based in part on the output of the at least one device or sensor. Still another embodiment of the present invention is where the control surface of the present invention is moved along a track on an aircraft, missile, projectile or underwater vehicle with respect to a secondary control surface. One example is to allow an aircraft to convert from a fixed wing to a swept wing configuration just by moving a second control surface along a track.

FIGS. 1-6 show various embodiments of the present invention. FIG. 1 is an isometric view of one embodiment of a missile 12 having a number of control surfaces 15. In FIG. 1, the missile 12 has fins 14 on its fore body 13 and aft body 16. Depending on this missile's 12 configuration either or both the fins on the fore body 13 and aft body 16 could be movable along a track (not shown).

Figure 2:
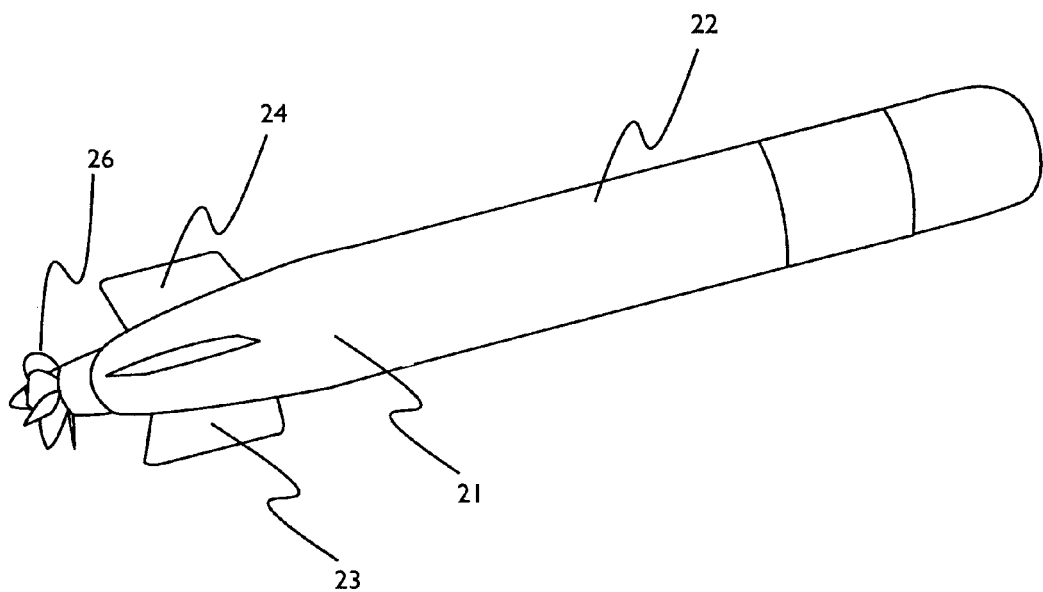
FIG. 2. Isometric view of one embodiment of a underwater vehicle having a number of control surfaces.

FIG. 2 is an isometric view of one embodiment of a torpedo 22 having a number of control surfaces 23 on its aft body 21. In FIG. 2, the torpedo 22 has four fins 24 (one not shown) on its aft body 21 along with a propeller 26 for driving the torpedo 22. At least one or more of the torpedo fins 24 or control surfaces 23 are movable along a track(s) (not shown).

Figure 3:
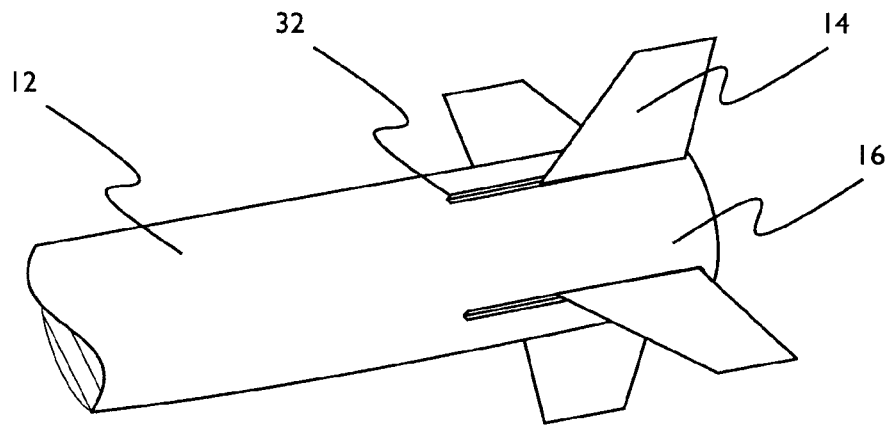
FIG. 3. Cutaway isometric view of one embodiment of the aft body of a missile with fins which are movable along a track.
Figure 4:
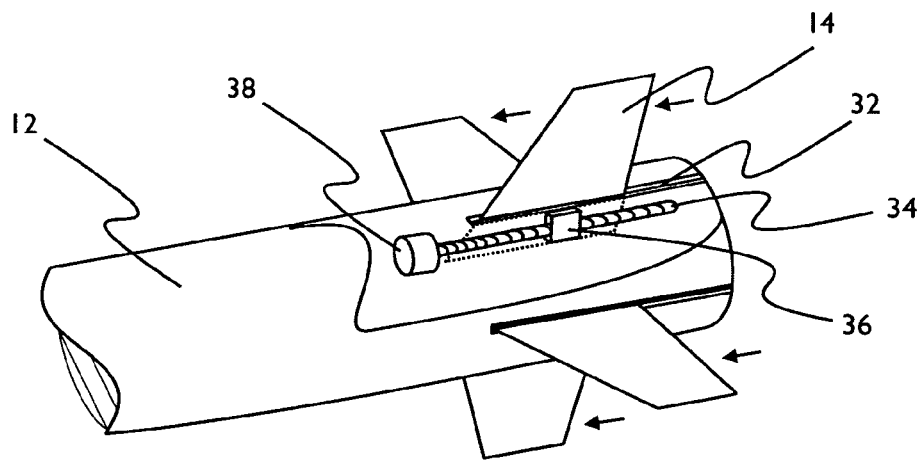
FIG. 4. Another cutaway isometric view the embodiment in FIG. 3 of the aft body of a missile with fins which have been moved into a forward position along a track.
Figure 5:
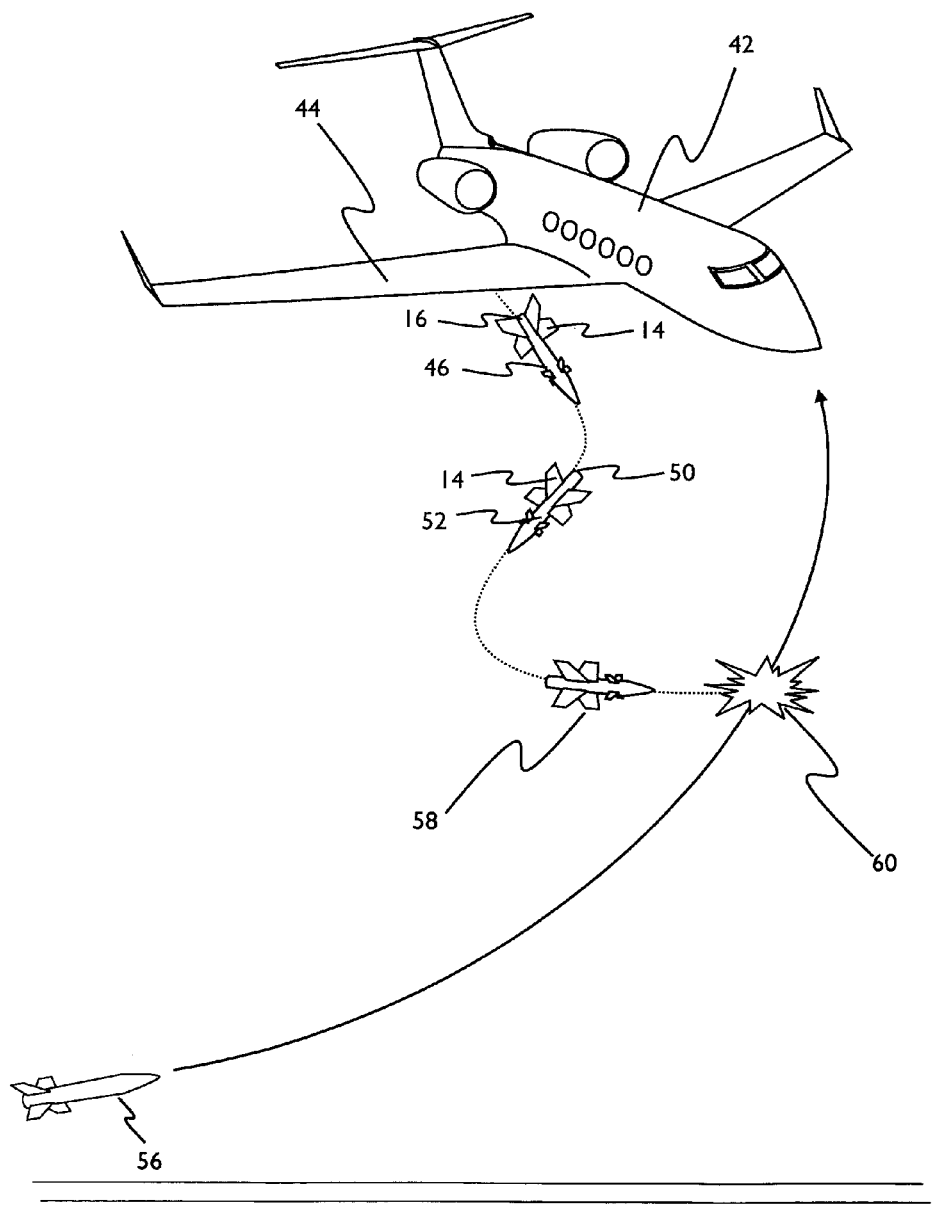
FIG. 5. Schematic view of the various stages of a missile fired from the aircraft to intercept another missile showing the fins on the missile fired from the aircraft which have been repositioned during the flight.

FIG. 3 is a cutaway isometric view of one embodiment of the aft body of a missile with fins which are movable along a track. In FIG. 3, a cutaway of a missile 12 is depicted having an aft body 16. The aft body 16 having four fins 14 which are movable along a track 32. FIG. 4 is another cutaway isometric view the embodiment in FIG. 3 of the aft body of a missile with fins which have been moved into a forward position along a track. In FIG. 4, the four fins 14 have been moved into a forward position along the track 32. In this particular embodiment, the fins 14 are moved along the track 32 by a screw type drive 38. The fins 14 are connected to the screw type drive 38 by a connector 36. The screw type drive 38 is rotated clockwise or counterclockwise to move the fins 14 forward or aft. The screw type drive 38 is powered by a motor (not shown).

Figure 6:
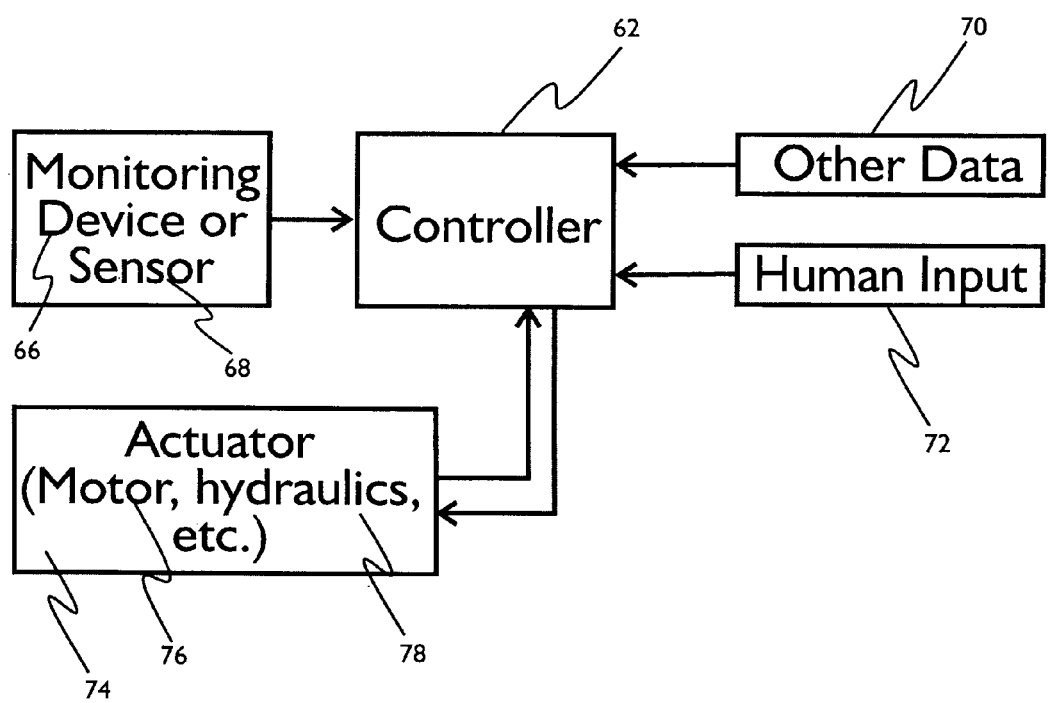
FIG. 6. Schematic flow diagram of track control system for aircraft, missile, projectile or underwater vehicle of the present invention.

FIG. 6 is a schematic flow diagram of track control system for aircraft, missile, projectile or underwater vehicle of the present invention. In FIG. 6, a controller 62 accepts input from a monitoring device 66 or sensor 68, other data 70 from various sources and/or human input 72. The controller 62 based at least in part on the input from a monitoring device 66 or a sensor 68 actuates a device 74 to move the control surface along a track. This actuator for example can be a motor 76 or hydraulics 78, which causes this movement.

Figure 7A:
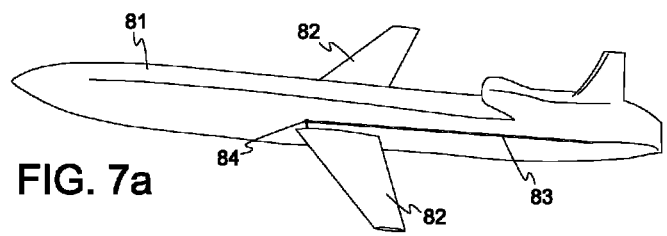
FIGS. 7a-7d. Illustrations of track-mounted control surfaces serving as ailerons and elevons.
Figure 7B:
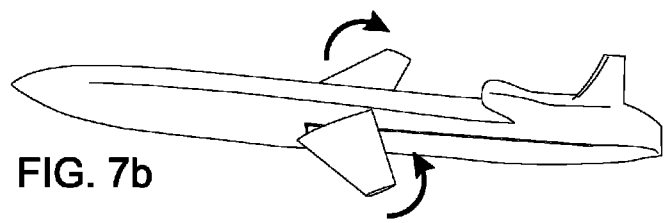
Figure 7C:
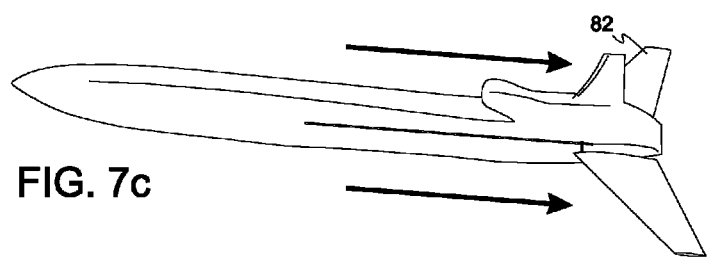
Figure 7D:
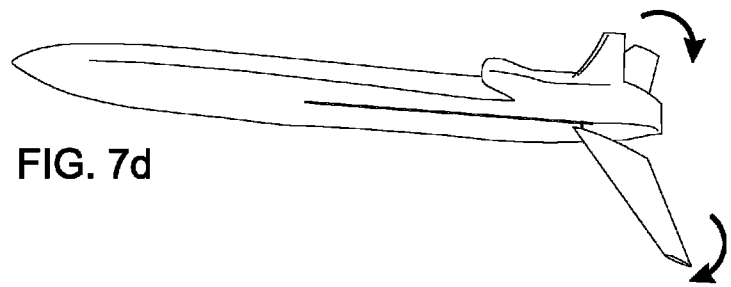

FIGS. 7a-7d show embodiments of the present invention wherein the track-mounted control surfaces may serve as ailerons or elevons for the aircraft, missile, underwater vehicle or projectile 81. In FIG. 7a, the control surfaces 82 are located roughly at midbody and are each connected to a track 83 along the body by a pivotable connector 84. In FIG. 7b, the control surfaces 82 are rotated in opposite directions with respect to each other, functioning as ailerons and rolling the aircraft, missile, underwater vehicle or projectile 81. In FIG. 7c, the control surfaces are moved along their respective tracks 83 to the aftbody of the aircraft, missile, underwater vehicle or projectile 81. In FIG. 7d, the control surfaces 82 are rotated in the same direction, functioning as elevons and controlling the pitch (as illustrated) or roll (not illustrated) of the aircraft, missile, underwater vehicle or projectile 81.

Figure 8A:
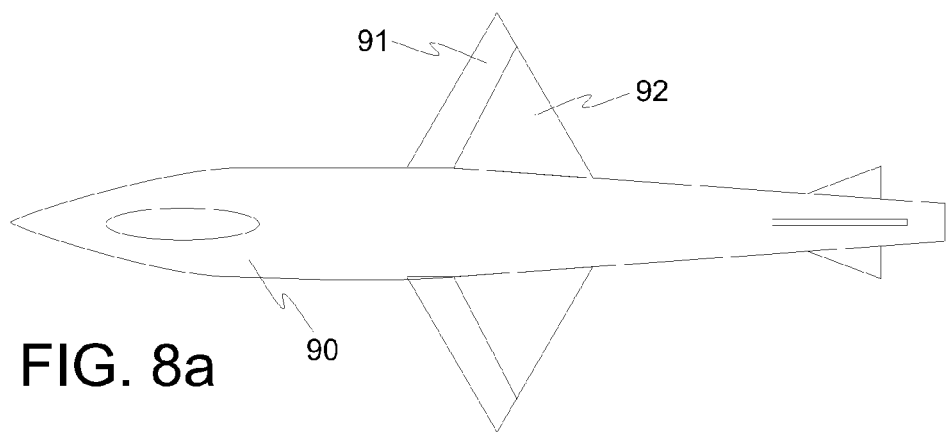
FIGS. 8a-8b. Plan views showing track-mounted control surfaces used to reconfigure wing sweep.
Figure 8B:
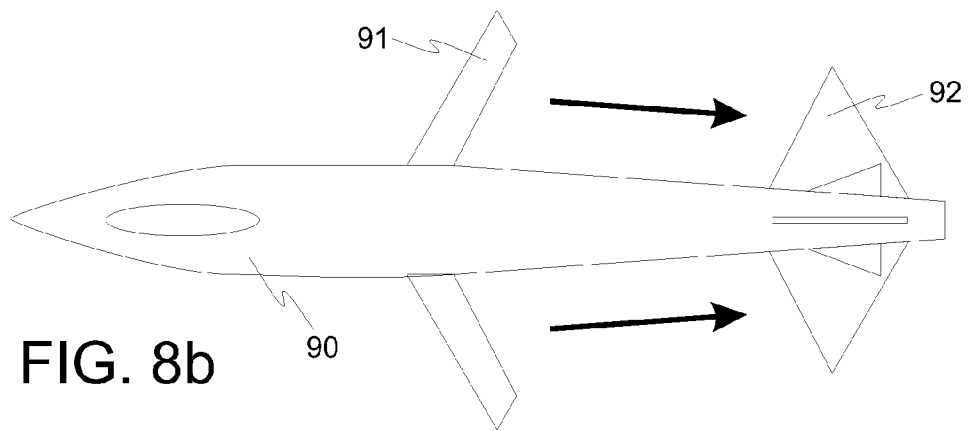

FIGS. 8a-8b show a embodiment of the present invention wherein the track-mounted control surfaces may move relative to stationary control surfaces to convert from a fixed wing to a swept wing configuration just by moving the control surfaces along their respective tracks. In FIG. 8a, track-mounted control surfaces 92 are positioned contiguous with stationary control surfaces 91 on the body 90 of an aircraft, missile, underwater vehicle or projectile to form a continuous control surface with no overall sweep. In FIG. 8b, track-mounted control surfaces 92 have moved along their tracks, resulting in the aircraft, missile, underwater vehicle or projectile having a swept-wing configuration.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed:

1. A method comprising:
   maneuvering an aircraft, missile, projectile or underwater vehicle by
   sensing a condition which requires a change in the center of pressure or a change in the static or dynamic stability of the aircraft, missile, projectile or underwater vehicle with at least one sensor having an output; and
   moving a control surface along a track positioned on the aircraft, missile, projectile or underwater vehicle's body wherein the moving of the control surface is performed by a control system based in part on the output of the at least one sensor.

2. The method in claim 1, wherein the sensor is from the group consisting of GPS, radar, altimeter, barometer, IR, RF and transmitter beacons.

3. The method in claim 1, further comprising the step of:
   controlling the moving of the control surface with a closed loop controller based in part on the output of the at least one sensor.

4. The method in claim 1, wherein the condition is a need for increased maneuverability of the aircraft, missile, projectile or underwater vehicle, and the control surface is moved along the track which decreases the distance between the center of gravity and center of pressure of the aircraft, missile, projectile or underwater vehicle.

5. The method in claim 1, wherein the sensor is a sensor for detecting other objects in proximity to the aircraft, missile, projectile or underwater vehicle.

6. The method in claim 1, wherein the control surface is moved along the track by a screw type drive.

7. The method in claim 1, wherein the condition sensed is a change in a target location or a possible collision with another object.

8. An aircraft, missile, projectile or underwater vehicle comprising:
   a body;
   a sensor or device having an output for detecting a change in condition requiring increased maneuverability;
   at least one track along the body; and
   at least one control surface for moving along the at least one track
   wherein the at least one control surface can be repositioned along the body by moving the at least one control surface along the at least one track in response to the output of the sensor or the device.

9. The aircraft, missile, projectile or underwater vehicle in claim 8, wherein the control surface is actuated by an onboard control system which is a proportional-integral-derivative (PID) controller, an adaptive predictive controller, or an adaptive predictive feedback controller.

10. The aircraft, missile, projectile or underwater vehicle in claim 8, further comprising a second stationary control surface wherein the aircraft, missile, projectile or underwater vehicle can be reconfigured by moving the at least one control surface along a track relative to the second stationary control surface to change from a fixed control surface configuration to a swept control surface configuration.

11. The aircraft, missile, projectile or underwater vehicle in claim 8, wherein the at least one movable control surface is a wing.

12. The aircraft, missile, projectile or underwater vehicle in claim 8, wherein the at least one movable control surface is a canard.

13. The aircraft, missile, projectile or underwater vehicle in claim 8, wherein the at least one movable control surface is a fin.

14. The aircraft, missile, projectile or underwater vehicle in claim 8, wherein the at least one movable control surface is an aileron.

15. The aircraft, missile, projectile or underwater vehicle in claim 8, wherein the at least one movable control surface is a vertical stabilizer.

16. The aircraft, missile, projectile or underwater vehicle in claim 8, wherein the at least one movable control surface is an elevon.

17. A method of controlling a missile, projectile or torpedo comprising the steps of:
   sensing a condition which requires a change in the center of pressure or a change in the static or dynamic stability of a missile, projectile or torpedo with at least one sensor or device having an output;
   moving a control surface along a track positioned on the missile, projectile or torpedo's body in response to the output from the sensor or device to allow the missile, projectile or torpedo to rapidly alter its flight path.

18. The method in claim 17, wherein the control surface is actuated with a closed loop controller based in part on the output from the sensor or device.

19. The method in claim 17, wherein the condition sensed is a change in a target location.

20. The method in claim 17, wherein the control surface is movably attached to the track by a connector and is capable of pivoting about the connector.

* * * * *